United States Patent [19]

Rozanski

[11] Patent Number: 5,441,303
[45] Date of Patent: Aug. 15, 1995

[54] SYSTEM AND METHOD FOR GAS BAG INFLATION AND DEFLATION

[75] Inventor: James D. Rozanski, Brigham City, Utah

[73] Assignee: Thiokol Corporation, Ogden, Utah

[21] Appl. No.: 179,734

[22] Filed: Jan. 10, 1994

[51] Int. Cl.⁶ .................. B60R 21/28; B60R 21/30
[52] U.S. Cl. .................. 280/738; 280/739; 422/166; 102/531
[58] Field of Search ........ 280/738, 739, 736, 741, 280/742, 737; 422/164, 165, 166, 167; 102/530, 531

[56] References Cited

U.S. PATENT DOCUMENTS

| | | | |
|---|---|---|---|
| 3,624,810 | 11/1971 | Hass | 280/738 |
| 3,632,133 | 1/1972 | Hass | 280/738 |
| 3,690,695 | 9/1972 | Jones, Sr. | 280/741 |
| 4,833,996 | 5/1989 | Hayashi et al. | 280/738 |
| 4,877,264 | 10/1989 | Cuevas | 280/738 |
| 5,004,586 | 4/1991 | Hayashi et al. | 280/738 |
| 5,058,921 | 10/1991 | Cuevas | 280/736 |
| 5,286,054 | 2/1994 | Cuevas | 280/738 |

FOREIGN PATENT DOCUMENTS

1324401 7/1973 United Kingdom ............ 280/738

Primary Examiner—Margaret A. Focarino
Assistant Examiner—Peter C. English
Attorney, Agent, or Firm—Madson & Metcalf; Ronald L. Lyons

[57] ABSTRACT

A system and method for inflating and deflating an air bag within a vehicle without substantially exposing the occupants of the vehicle to toxic compounds, particulates, and other contaminants in the gas mixture used to inflate the air bag. The system includes a flow guide having an exterior port in fluid communication with the ambient air outside the vehicle, an air bag port connectable in fluid communication with the air bag, and an internal bore permitting fluid flow between the exterior port and the air bag. A nozzle disposed within the flow guide bore is secured to an inflator containing a pressurized gas source. The nozzle and flow guide preferably have certain geometric characteristics disclosed herein. In operation, gas is expelled from the gas bag inflator through the nozzle at a velocity sufficient to entrain ambient air from outside the vehicle. The entrained ambient air mixes with the gas expelled through the nozzle, and the mixture inflates the air bag. The air bag is deflated by moving the mixture out of the air bag and through the flow guide bore for disposition amidst ambient air outside the vehicle. Thus, the vehicle's occupants are not substantially exposed to the mixture and its contaminants, because the bag is vented outside the vehicle.

8 Claims, 8 Drawing Sheets

SYSTEM AND METHOD FOR GAS BAG INFLATION AND DEFLATION

FIELD OF THE INVENTION

The present invention relates to a system and method for inflating and deflating a gas bag, and more particularly to a system and method for entraining air from outside a vehicle during air bag inflation and for venting gas generant combustion products outside the vehicle during air bag deflation.

TECHNICAL BACKGROUND OF THE INVENTION

When properly designed and implemented, automobile air bag restraint devices can dramatically reduce the injury and loss of life caused by automobile collisions. A properly deployed air bag may cushion a driver or passenger, thereby reducing the risk of injury. Proper air bag deployment includes rapidly inflating the air bag to a volume sufficient to cushion the occupant. Air bag inflator elements and their design and operation are described in the commonly owned and copending application for Method and System for Evaluating Gas Generants and Gas Generators, application Ser. No. 08/179,727, filed Jan. 10, 1994, which is incorporated herein by reference. The terms "gas bag" and "air bag" are used interchangeably herein.

Gas bags are typically inflated by combustion of a chemical gas generant. As the gas generant combusts, it produces gases and other combustion products which rapidly increase both the temperature and pressure within the air bag. Automobile manufacturers and others have set forth detailed specifications for gas generants. Preparing gas generating compositions that meet these important design criteria is an extremely difficult task. These specifications require that the gas generating composition produce gas at a required rate. The specifications also place strict limits on the generation of toxic or harmful gases or solids. Examples of restricted gases include carbon monoxide, carbon dioxide, NOx, SOx, and hydrogen sulfide.

The automobile manufacturers have also specified that the gas be generated at a sufficiently and reasonably low temperature so that the occupants of the car are not burned upon impacting an inflated air bag. If the gas produced is overly hot, there is a possibility that the occupant of the motor vehicle may be burned upon impacting a just deployed air bag. Accordingly, it is necessary that the combination of the gas generant and the construction of the air bag isolates automobile occupants from excessive heat. All of this is required while the gas generant maintains an adequate burn rate. In the industry, burn rates in excess of 0.5 inch per second (ips) at 1,000 psi, and preferably in the range of from about 1.0 ips to about 1.2 ips at 1,000 psi are generally desired.

Another related but important design criteria is that the gas generant composition produce a limited quantity of particulate materials. Particulate materials can interfere with the operation of the air bag restraint system, present an inhalation hazard, and irritate the skin and eyes. The spreading of potentially harmful dust in the vicinity of the spent air bag can cause lung, mucous membrane, and eye irritation to vehicle occupants and rescuers.

At present, sodium azide is the most widely used and accepted gas generating material. Sodium azide nominally meets industry specifications and guidelines. Nevertheless, sodium azide presents a number of persistent problems. Sodium azide is relatively toxic as a starting material, since its toxicity level as measured by oral rat $LD_{50}$ is in the range of 45 mg/kg. Workers who regularly handle sodium azide have experienced various health problems such as severe headaches, shortness of breath, convulsions, and other symptoms.

In addition, sodium azide combustion products can also be toxic since molybdenum disulfide and sulfur are presently the preferred oxidizers for use with sodium azide. The reaction of these materials produces toxic hydrogen sulfide gas, corrosive sodium oxide, sodium sulfide, and sodium hydroxide powder. Rescue workers and automobile occupants have complained about both the hydrogen sulfide gas and the corrosive powder produced by the operation of sodium azide-based gas generants.

One known approach to reducing the concentrations of toxic compounds and particulates within the inflated gas bag is to entrain air from inside the vehicle and mix it with the gas generant combustion products during gas bag inflation. The entrained air dilutes the output of the gas bag generator, and may reduce the amount of gas generant needed to inflate a bag to a specified volume within a specified time. Heaters may also be provided in the inflator to increase pressure and reduce the gas generant mass flow rate needed for acceptable inflation. Another known approach to reducing toxicity and particulate concentrations is to mix the gas generator output with a diluting gas stored in a pressurized chamber within the gas bag inflator, such as in a so-called hybrid inflator. In these cases, however, the undesirable concentrations are merely reduced, and are not eliminated.

The bag is provided with a venting means through which gases vent into the interior of the car when the pressure inside the bag exceeds ambient pressure. The venting means may include open vents up to about two inches in diameter through the membrane of the gas bag. The venting means may also include use of a porous material as part of the bag membrane. The porous material is typically installed on the side of the bag opposite the driver or passenger, so the bag does not vent directly in their faces but nonetheless vents into the interior of the vehicle.

Venting begins on inflation, typically as soon as the pressure within the bag exceeds ambient pressure by as little as one pound per square inch. Forced venting, caused by the impact of an occupant against the bag membrane, uses the occupant's kinetic energy to deflate the bag, thereby reducing the energy that carries the occupant into an interior surface of the car. The impact of the occupant against the bag therefore forces toxic compounds and particulates within the gas bag to be vented into the interior of the car.

Thus, it would be an advancement in the art to provide a system and method for inflating and deflating a gas bag which do not substantially expose a vehicle's occupants to gas generant compositions or to the combustion products of such compositions.

Such a system and method are disclosed and claimed herein.

BRIEF SUMMARY OF THE INVENTION

The present invention provides a system and method for inflating and deflating a gas bag which do not substantially expose a vehicle's occupants to gas generant compositions or to the combustion products of such compositions. The system is connectable to an air bag within a vehicle. The air bag has an orifice for receiving an inflating gas.

The system includes a flow guide which has an exterior port in fluid communication with the ambient air outside the vehicle. The flow guide has an air bag port connectable in fluid communication with the air bag orifice, and an internal bore permitting fluid flow between the exterior port and the bag port. A nozzle disposed within the flow guide bore is secured to an inflator. The inflator contains a source of pressurized gas. The inflator is configured to expel pressurized gas through the nozzle into the flow guide bore.

In operation, the gas bag inflator is actuated by an igniter squib or other conventional means. The actuated inflator expels gas through the nozzle at a velocity sufficient to entrain ambient air from outside the vehicle. The entrained ambient air is mixed with the gas expelled through the nozzle, and the mixture is directed by the flow guide into the gas bag, thereby inflating the gas bag with a mixture comprising ambient air and gas expelled through the nozzle. After the occupant of the car impacts the inflated gas bag, or the gas bag reaches a threshold pressure for some other reason, deflation begins. The air bag is deflated by moving a portion of the mixture out of the air bag, along the fluid flow path, and into contact with the ambient air outside the vehicle. Unlike prior approaches, the present invention does not vent any substantial portion of the gas bag contents into the vehicle where it may adversely affect the vehicle's occupants. Although toxic compounds and particulates in the gas bag inflator output are undesirable under both conventional approaches and the teachings of the present invention, the risk of injury from such compounds and particulates is reduced by the present invention.

These and other features and advantages of the present invention will become more fully apparent through the following description and appended claims taken in conjunction with the accompanying drawings.

BRIEF DESCRIPTION OF THE DRAWINGS

In order that the manner in which the above-recited and other advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
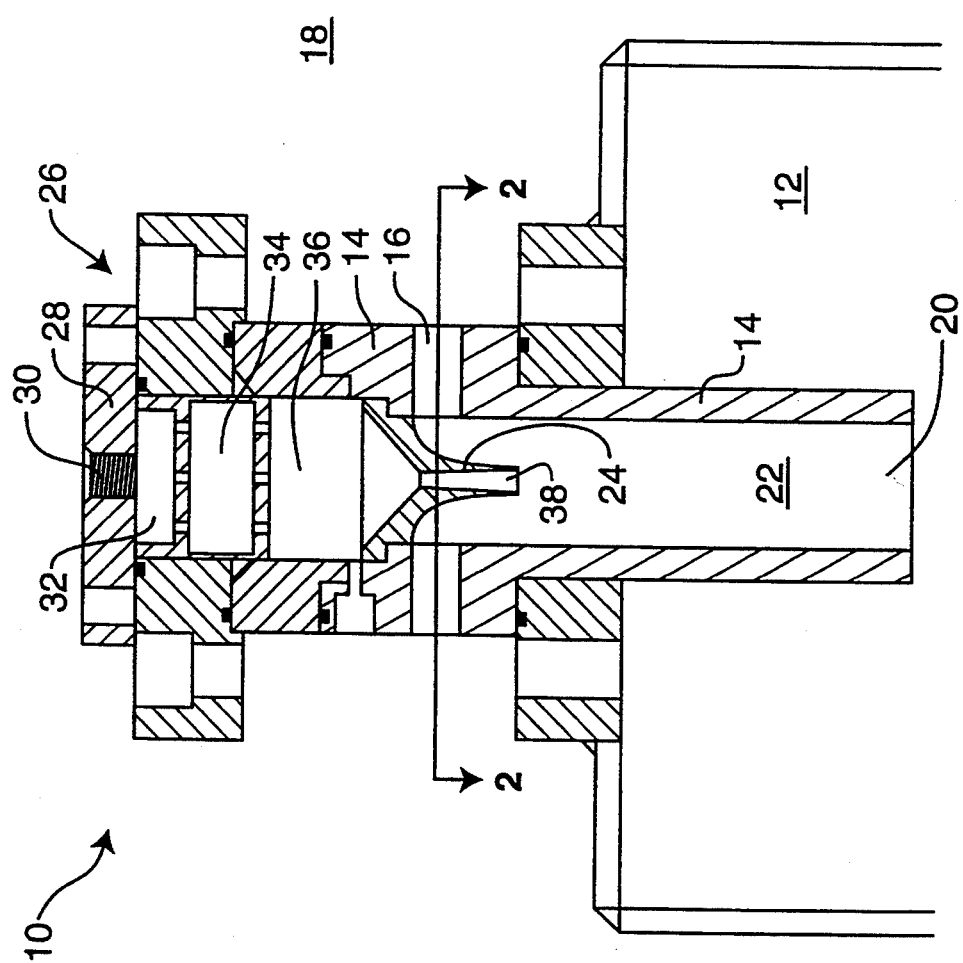
FIG. 1 is a longitudinal cross section view of a gas bag inflator, nozzle, and flow guide according to the present invention, which are attached in fluid communication to a pressure tank of a test fixture.

Reference is now made to the figures wherein like parts are referred to by like numerals. The present invention relates to a system and method for inflating and deflating a gas bag which do not substantially expose a vehicle's occupants to gas generant compositions or to the combustion products of such compositions. FIG. 1 illustrates a system according to the teachings of the present invention, generally designated at 10. The system 10 is connectable to a conventional air bag (not shown). The air bag includes an air bag orifice configured for receiving an inflating gas from the system 10. As shown in FIG. 1, the system 10 is connected to a test fixture which includes a tank 12 capable of holding pressurized gas.

Figure 2:
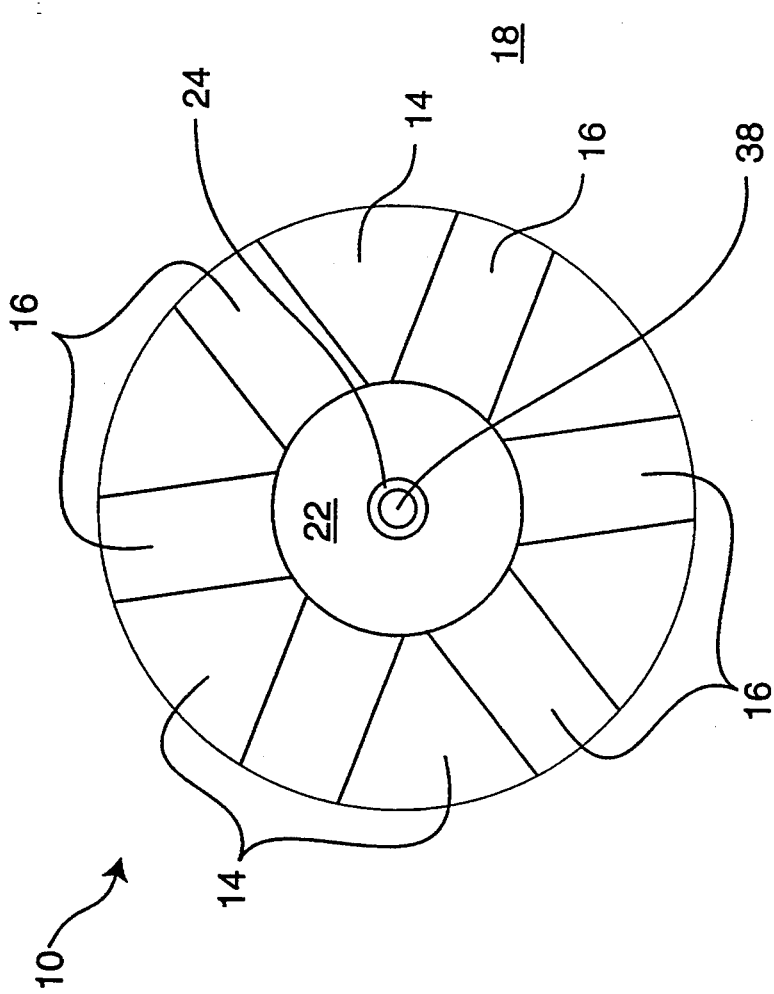
FIG. 2 is a transverse cross section view along line 2—2 of FIG. 1, further illustrating a plurality of exterior ports in the flow guide.

The system 10 includes a flow guide 14 which has an exterior port 16. As shown best in FIG. 2, the presently preferred embodiment of the flow guide 14 has a plurality of exterior ports 16. For use within a vehicle (not shown), the system 10 is configured with the exterior port(s) 16 placed in fluid communication with the ambient air 18 outside the vehicle. During testing, the system 10 is configured as shown in FIG. 1 with the exterior port 16 placed in fluid communication with the ambient air 18 outside the tank 12.

The flow guide 14 also has an air bag port 20. The air bag port 20 is connectable in fluid communication with the air bag orifice of an air bag when the system 10 is configured for use in a vehicle. During testing, the air bag port 20 is placed in fluid communication with the pressure tank 12. The flow guide 14 has a longitudinal bore 22 which permits fluid flow between the exterior port 16 and the bag port 20.

A nozzle 24 is disposed within the flow guide bore 22. The nozzle 24 is secured to an inflator, designated generally at 26. The inflator 26 contains a squib plate 28 having a squib port 30. The squib port 30 adjoins an igniter chamber 32. The igniter chamber 32 is in fluid communication with a combustion chamber 34, which communicates in turn with a diffusion chamber 36. The diffusion chamber 36 is in fluid communication with the nozzle interior 38, and thence with the flow guide bore 22. It will be appreciated that other gas bag inflator embodiments may be used according to the teachings of the present invention, including hybrid inflators, inflators containing screens, deflectors, or burst plates, and inflators having more or fewer chambers than the inflator 26 illustrated here.

In operation, the inflator 26 serves as a source of pressurized gas. A squib positioned in the squib port 30 is actuated, thereby igniting a chemical igniter composition located in the igniter chamber 32. The ignited igniter in turn initiates combustion of gas generant pills (not shown) disposed within the combustion chamber 34. The igniter may be a conventional composition such as boron potassium nitrate. The gas generant may be a conventional composition such as sodium azide.

As the gas generant combusts, it produces gases and other combustion products which rapidly increase both the temperature and pressure within the combustion chamber 34. The combustion products flow into the diffusion chamber 36, thereby increasing both the pressure and the concentration of combustion products within the diffusion chamber 36. Accordingly, the inflator 26 expels pressurized gas and gas generant combustion products in a jet from the nozzle interior 38 into the flow guide bore 22.

The jet from the nozzle 24 creates a pressure differential between the flow guide bore 22 and the ambient air 18 which draws ambient air 18 from outside the flow guide 14 into the flow guide bore 22. The ambient air 18 thus drawn into the flow guide bore through action of the jet from the nozzle 24 is herein termed "entrained air." The entrained air mixes with the gas and gas generant combustion products expelled from the nozzle 24, thereby reducing the concentrations of toxic compounds and particulates in the gas inside the bore 22. This mixture travels to the pressure tank 12 during testing, and travels into an air bag when the system 10 is used in a vehicle. The entrained air may reduce the amount of gas generant needed to inflate a bag to a specified volume within a specified time.

Figure 3:
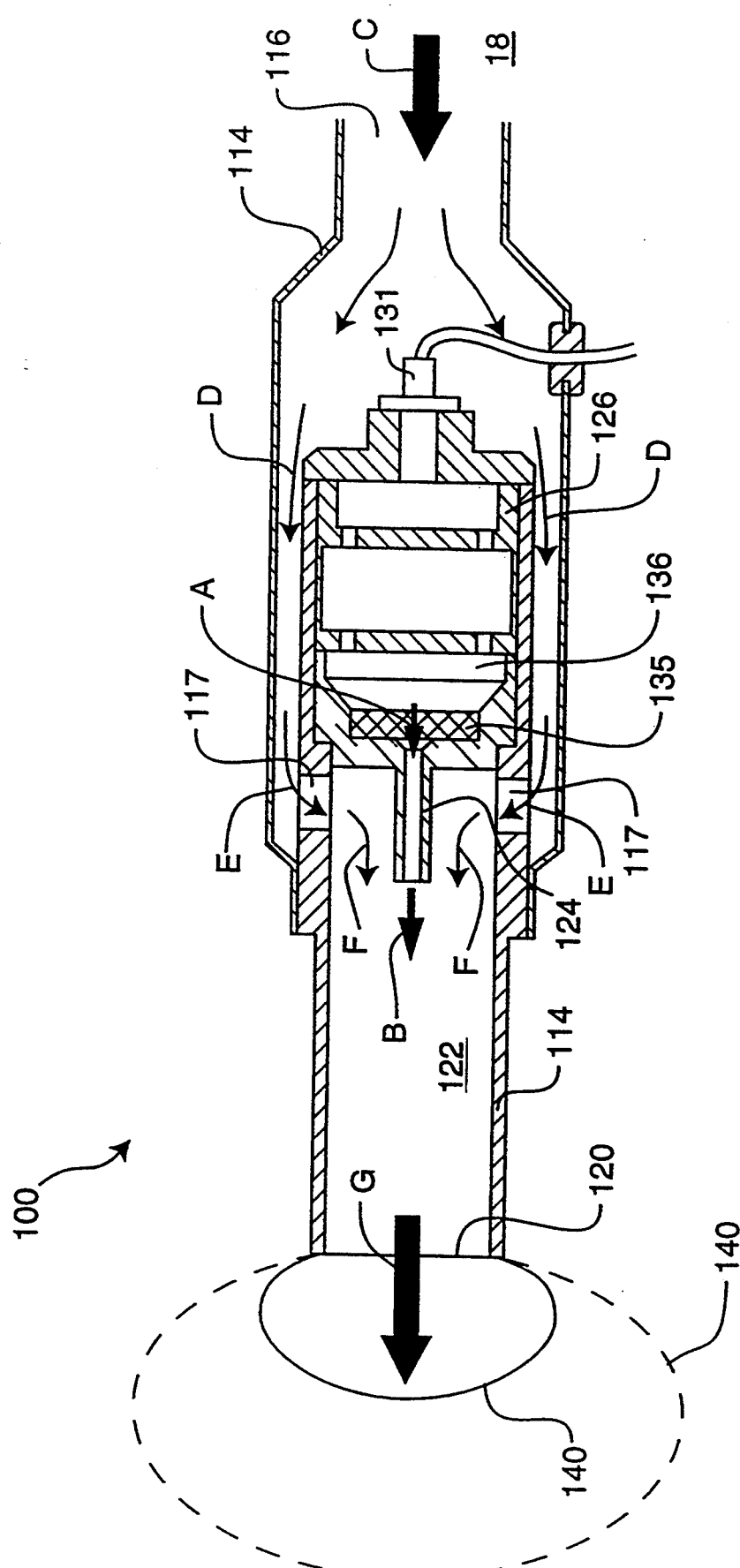
FIG. 3 is a longitudinal cross section view of an alternative embodiment of the gas bag inflator, nozzle, and flow guide of the present invention, wherein arrows indicate the flow of gases expelled from the gas bag inflator and the flow of ambient air entrained from outside the vehicle as the gas bag inflates.

The entrainment of ambient air is further illustrated in FIG. 3, which shows a system 100 that is an alternative embodiment of the system 10 of FIG. 1. The system 100 includes an inflator 126 configured to produce pressurized gas upon actuation of a squib 131. A screen pack 135 is disposed within a diffusion chamber 136. The pressurized gas is expelled by the inflator 126 through the screen pack 135 and then through a nozzle 124, as indicated by Arrow A. The pressurized gas emerges from the nozzle 124 into a bore 122 of a flow guide 114, as indicated by Arrow B. Arrow B thus denotes generally in this system 100 the location of the jet referred to above in connection with the embodiment 10 in FIG. 1.

The jet denoted by Arrow B entrains ambient air 18 from outside the vehicle (not shown). The jet creates a pressure differential which begins entraining ambient air 18 by pulling ambient air 18 into an exterior port 116, in a direction denoted generally by Arrow C. The entrained air travels within the flow guide 114 in a direction indicated generally by Arrows D. The entrained air travels through a plurality of secondary exterior ports 117, as indicated generally by Arrows E, and into the bore 122, as indicated by Arrows F. It will be appreciated that backflows, recirculations, and other fluid dynamic behaviors may prevent part of the ambient air 18 that is pulled into the exterior port 116 from reaching the bore 122. However, a substantial amount of ambient air 18 does reach the bore 122, and this ambient air 18 is said herein to be entrained.

The entrained ambient air 18 mixes inside the bore 122 with the gases and combustion products expelled through the nozzle 124. The resulting mixture is directed by the flow guide 114 through a gas bag port 120 into a gas bag 140, as indicated generally by Arrow G. Initially, the gas bag 140 is not inflated. Upon receiving the flow of ambient air 18 and output from the inflator 126, however, the gas bag inflates, as indicated by phantom lines.

Figure 4:
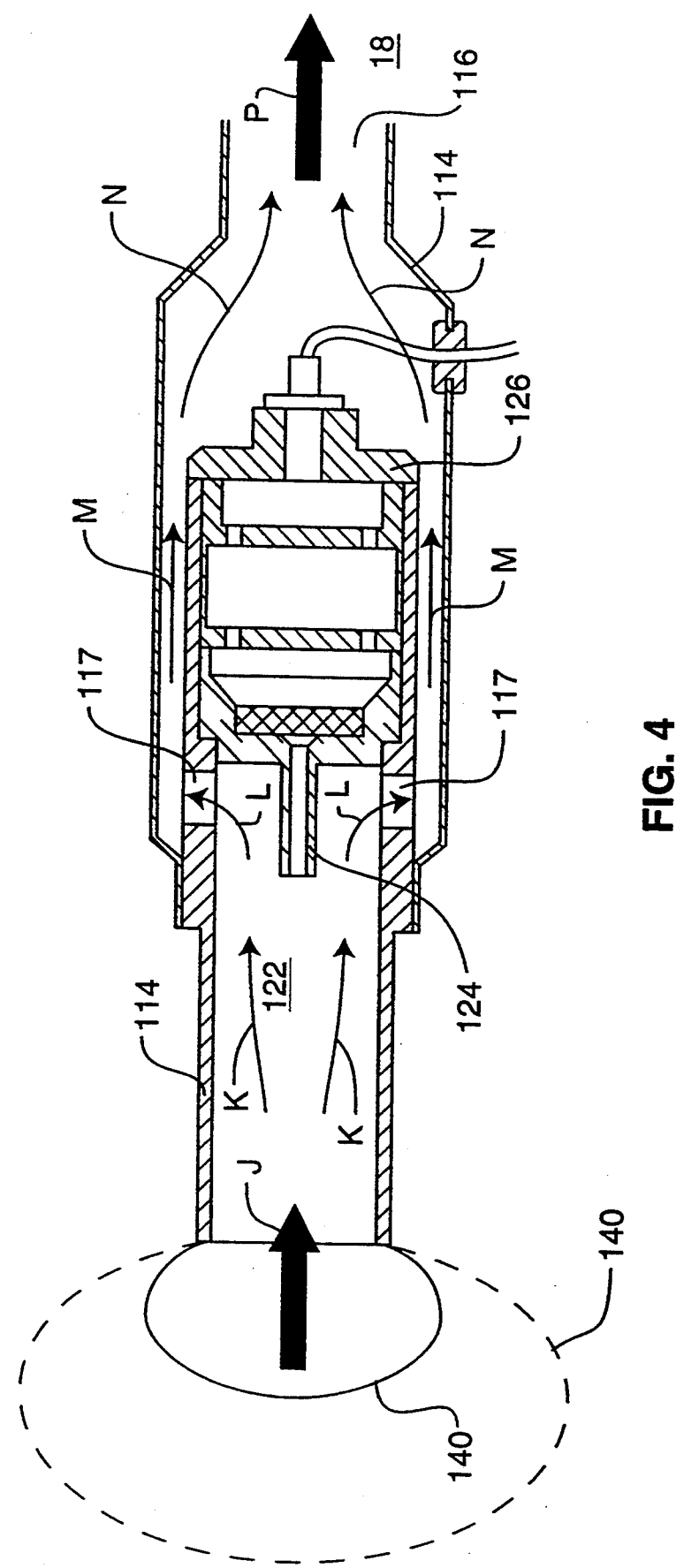
FIG. 4 is a longitudinal cross section view of the embodiment shown in FIG. 3, wherein arrows indicate the backflow of gases expelled from the gas bag into the ambient air outside the vehicle as the gas bag deflates.

After the occupant of the car impacts the inflated gas bag 140, deflation occurs. Even before impact, however, a gas bag 140 constructed according to the prior art may begin venting into the interior of the car, either through vent orifices in the air bag 140, or through a porous membrane if the air bag 140 includes such a membrane. By contrast, a gas bag 140 constructed according to the teachings of the present invention vents only to the exterior of the vehicle. As illustrated in FIG. 4, the air bag 140 moves from an inflated position, shown in phantom, to a deflated position, shown in solid line. As the air bag 140 deflates, the mixture with which the air bag 140 was inflated as just described flows out of the air bag 140, as indicated generally by Arrow J. The mixture flows along the bore 122 in the reverse direction as indicated generally by Arrows K, and through the secondary exterior ports 117, as indicated generally by Arrows L. As there is no outlet to the inflator 126, little or none of the mixture will flow back through the nozzle 124. The mixture continues flowing through the flow guide 114 as indicated generally by Arrows M and N, until it reaches the primary exterior port 116 and flows out into the ambient air 18 outside the vehicle, as indicated by Arrow P, in accordance with the teachings of the present invention.

Unlike prior approaches, the present invention does not vent within the vehicle any substantial portion of the mixture used to inflate the gas bag 140. The only vent is into the flow guide 114, which directs the mixture away from the car's occupants. Thus, the occupants of the vehicle are not at risk of being exposed to concentrated combustion products, particulates, residual uncombusted gas generants, and other products of the inflator 126. Toxic compounds and particulates in the gas bag inflator 126 output are undesirable under the teachings of the present invention, but the risk of injury from such compounds and particulates is greatly reduced by venting the deflating air bag 126 to ambient air 18 outside the vehicle.

Figure 5:
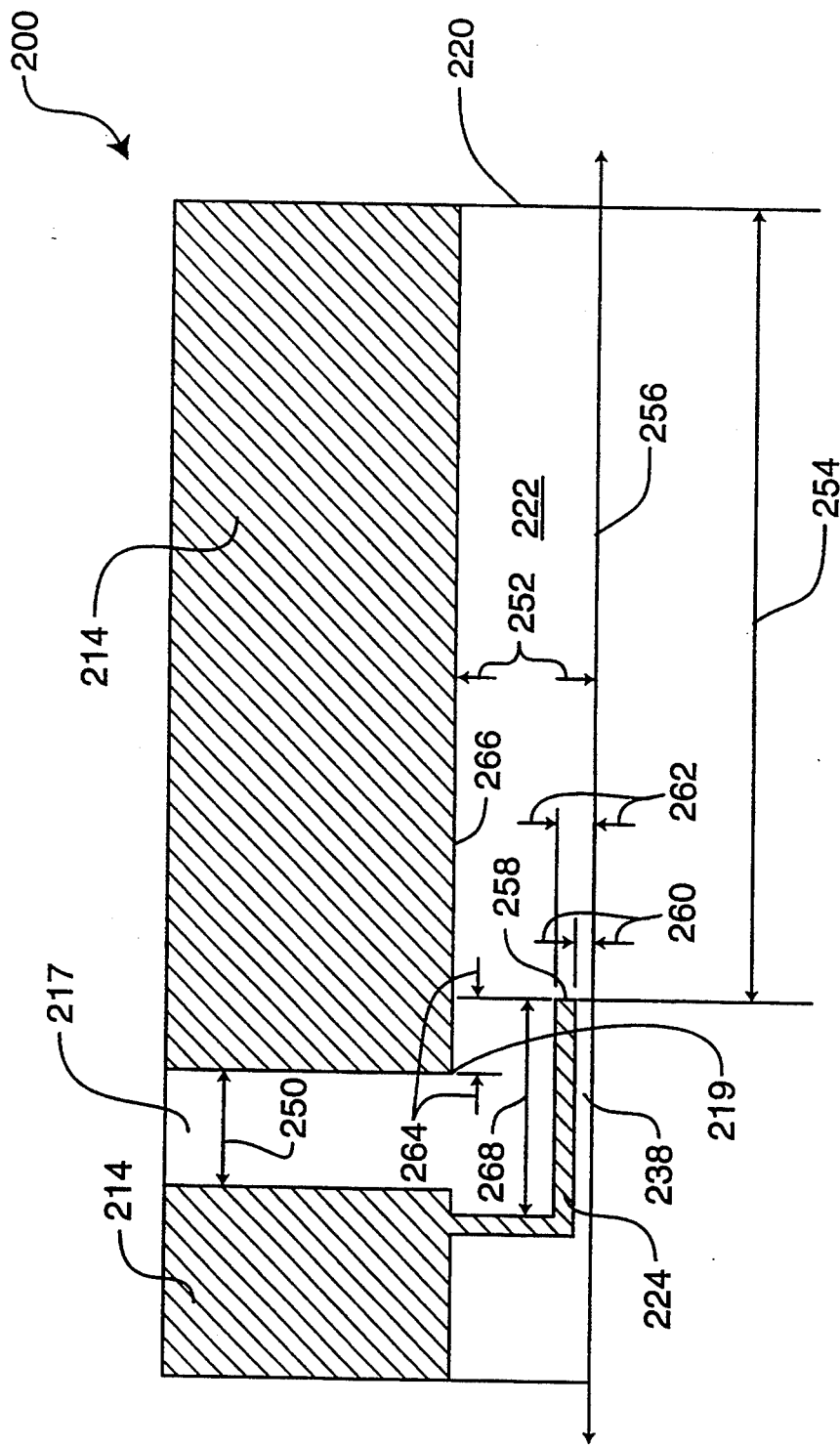
FIG. 5 is a longitudinal cross section axi-symmetric view of a flow guide and nozzle according to the present invention.

To more particularly describe the features of the present invention used in entraining ambient air and in venting the mixture within the gas bag back into the ambient air, FIG. 5 illustrates a computer-implemented axi-symmetric two-dimensional embodiment 200 of a nozzle 224 and a flow guide 214. As set forth below, this embodiment 200 served as the basis for a fabricated (tangible) test system, as well as for a computer-implemented model of the fluid dynamics of the system 200.

The system 200 includes a single axi-symmetric exterior port 217 in the flow guide 214, the port 217 having a width indicated at 250. The fabricated inflator based on the system 200 included six ports 217, each having a diameter $D_{port}$, in a radially symmetric configuration as that illustrated by the ports 16 in FIG. 2. The port 217 of FIG. 5 is in fluid communication with a bore 222 which has a radius $R_{bore}$ indicated at 252. The bore 222 has a length $L_{bore}$, indicated at 254. The length 254 of the bore 222 is measured along a central longitudinal axis 256 of the bore 222, from an air bag port 220 at one end of the bore 222 to an end 258 of a nozzle 224. The nozzle 224 has an internal radius $R_{nozzle-int}$, indicated at 260, and an external radius $R_{nozzle-ext}$, indicated at 262. The end 258 of the nozzle 224 extends beyond the port 217 a lead length $L_{lead}$, indicated at 264. The lead length 264 is measured as shown along a wall 266 which partially defines the bore 222. The nozzle 224 has a length $L_{nozzle}$ indicated at 268.

In a presently preferred embodiment of the system 200, $D_{port}$ is 0.5 inches, $R_{bore}$ is 0.61 inches, $L_{bore}$ is 3.72 inches, $R_{nozzle-int}$ is 0.07 inches, $R_{nozzle-ext}$ is 0.143 inches, and $L_{lead}$ is 0.536 inches. Thus, the ratio of $L_{lead}$ to $R_{bore}$ is about 0.88. Other embodiments also have a ratio of $L_{lead}$ to $R_{bore}$ in the range from about 0.5 to about 1.0, and preferably in the range from about 0.8 to about 0.9.

Figure 6:
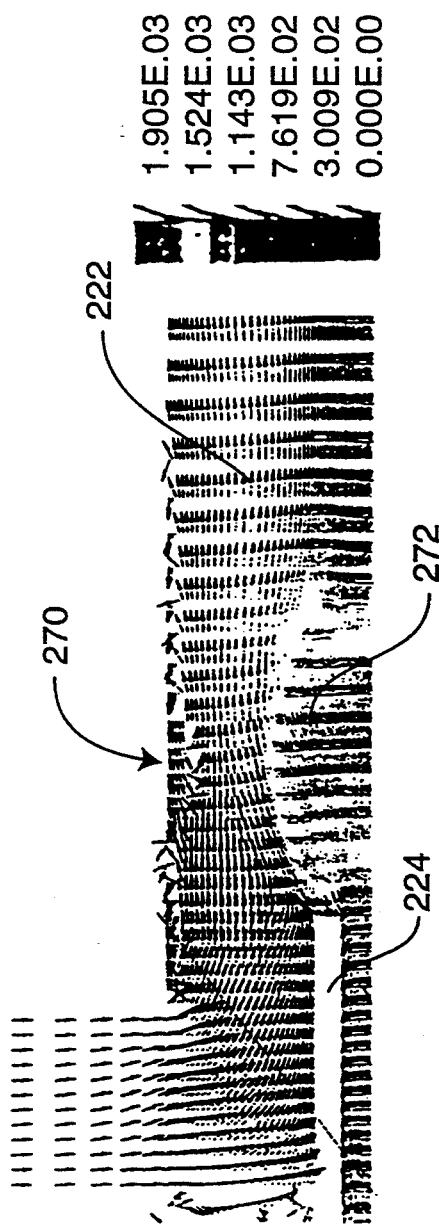
FIG. 6 is a computer-generated steady state velocity vector plot of one embodiment of the flow guide and nozzle of the present invention.
Figure 7:
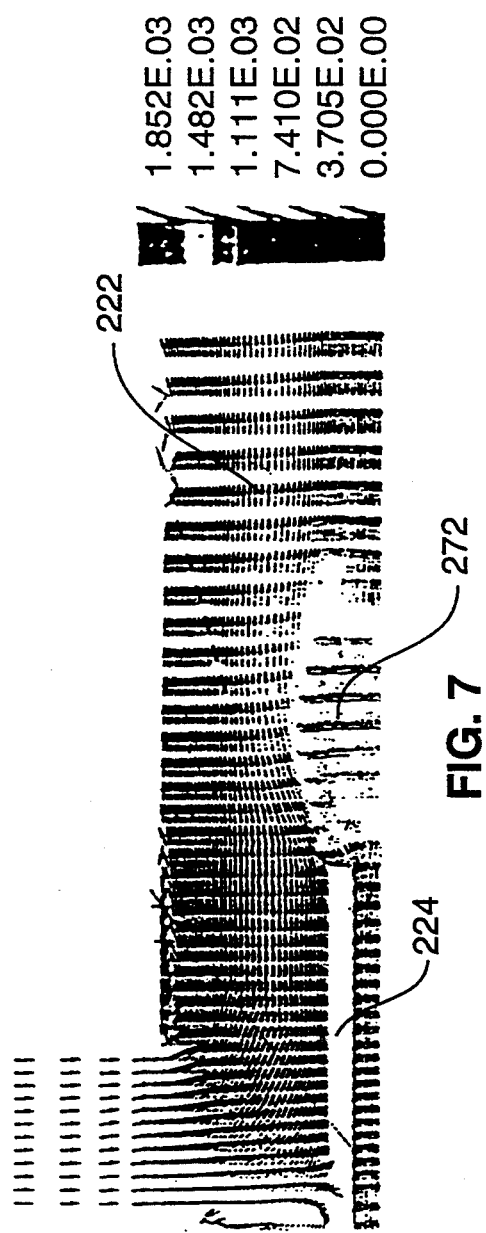
FIG. 7 is a computer-generated steady state velocity vector plot of an improvement on the embodiment shown in FIG. 6.

FIGS. 6 and 7 illustrate the importance of the ratio of $L_{lead}$ to $R_{bore}$. FIG. 6 shows a steady state computational velocity vector plot of fluid flow within a system having the same general configuration as system 200 of FIG. 5, but having a ratio of $L_{lead}$ to $R_{bore}$ of about 0.5. This ratio of about 0.5 results in formation of a vortex, indicated generally at 270, near the jet plume 272 from the nozzle 224. In FIG. 7, by contrast, the ratio of $L_{lead}$ to $R_{bore}$ is about 0.88. As a result, no vortex is formed. Vortexes are undesirable because they decrease the efficiency with which a gas bag is inflated and deflated via gases moving through the bore 222.

Figure 8:
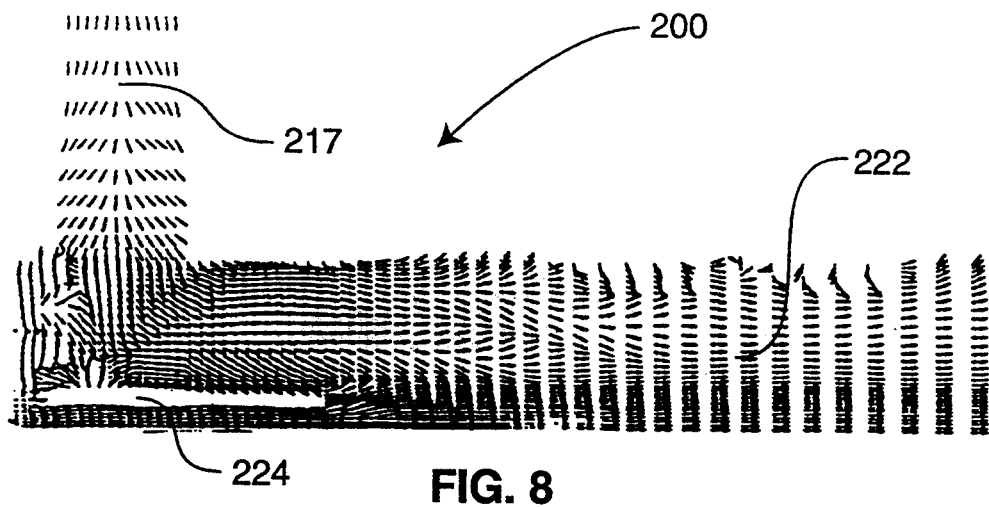
FIG. 8 is a computer-generated transient velocity vector plot of an embodiment of the flow guide and nozzle of the present invention showing fluid flows 10 milliseconds after actuation of the gas bag inflator.
Figure 9:
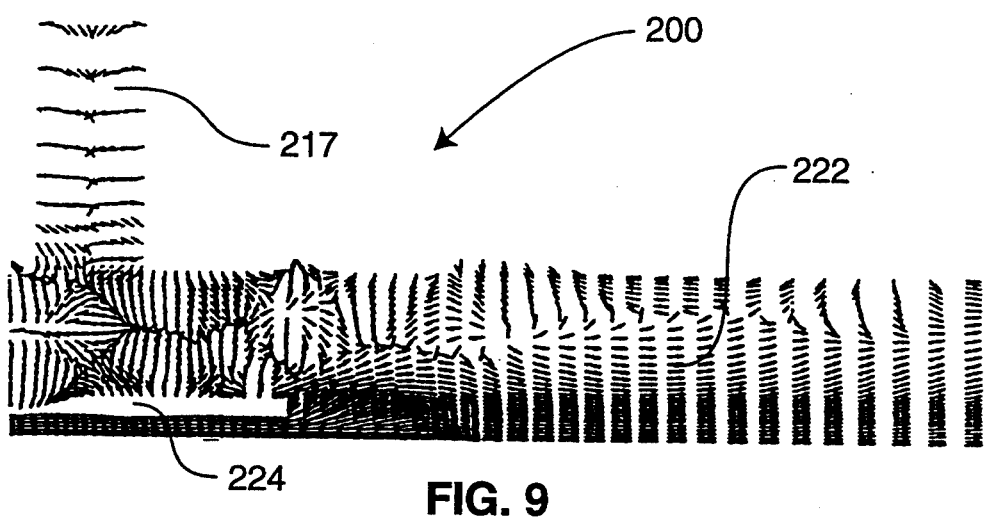
FIG. 9 is a computer-generated transient velocity vector plot of the embodiment shown in FIG. 8 illustrating fluid flows 40 milliseconds after actuation of the gas bag inflator.
Figure 10:
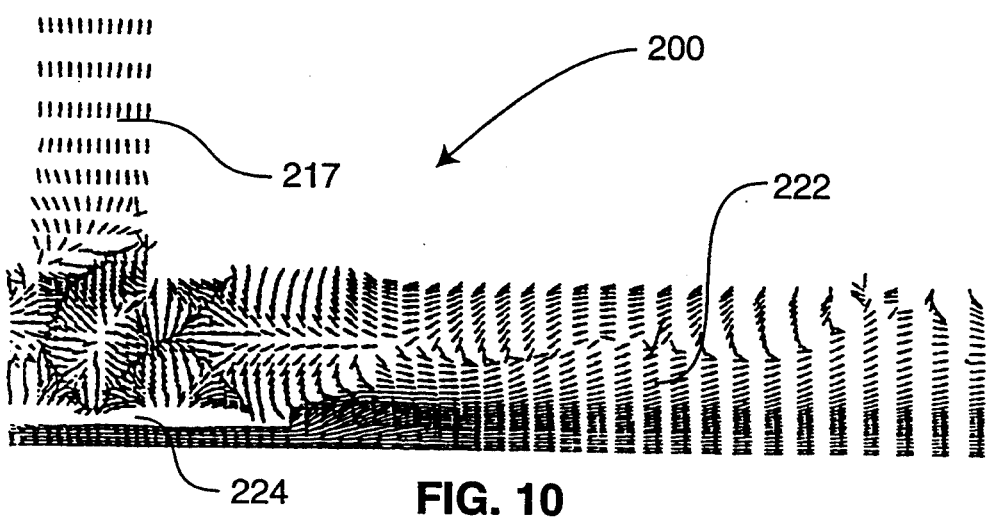
FIG. 10 is a computer-generated transient velocity vector plot of the embodiment shown in FIG. 8 illustrating fluid flows 45 milliseconds after actuation of the gas bag inflator.

FIGS. 8 through 10 illustrate the transient flow behavior of a system 200 in which the ratio of $L_{lead}$ to $R_{bore}$ is about 0.88. FIG. 8 depicts the fluid behavior at time t=ten milliseconds. Ambient air is being entrained into the port 217, as indicated by the vectors in FIG. 8 shown within the port 217 pointing generally toward the nozzle 224 and the bore 222. At forty milliseconds, as shown in FIG. 9, backflow is starting to occur within the bore 222, but not yet within the port 217. At forty-five milliseconds, however, backflow back out of the port 217 into the ambient air outside the vehicle occurs, as illustrated in FIG. 10.

Figure 11:
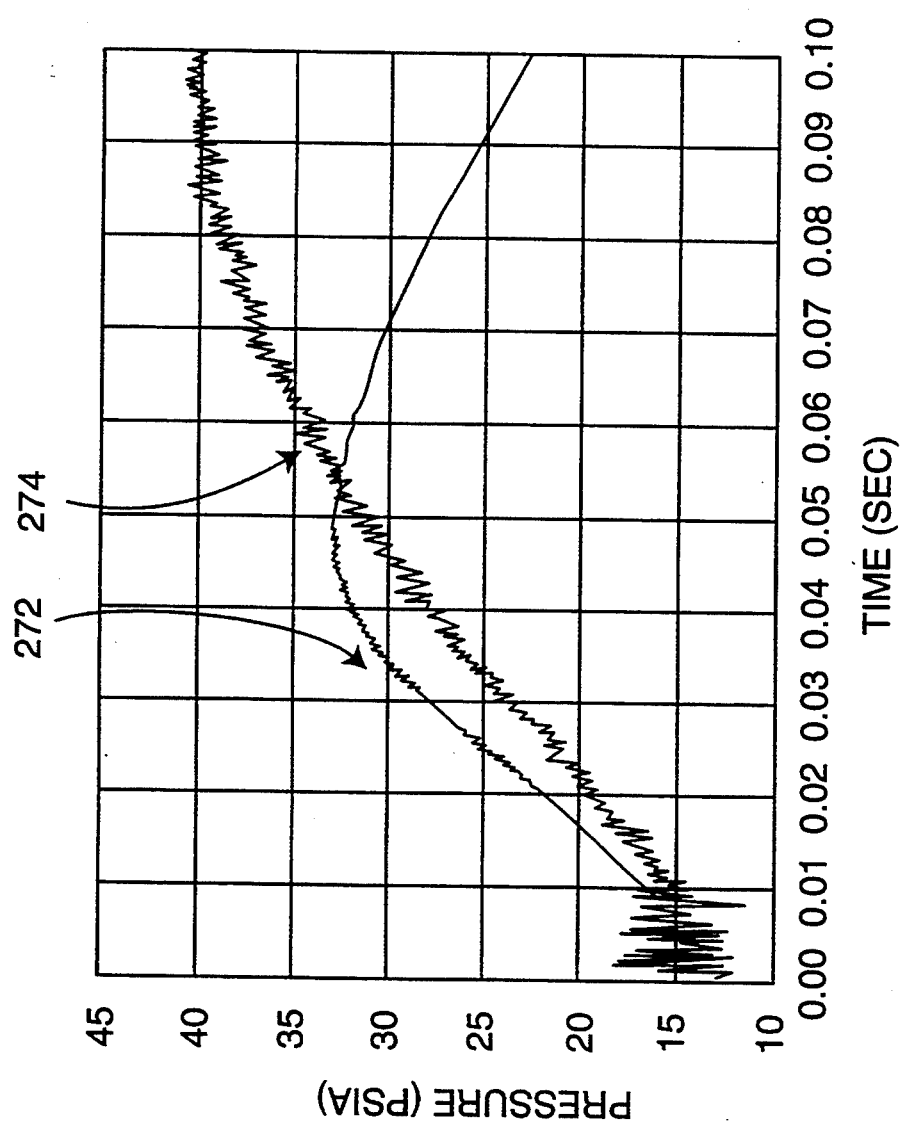
FIG. 11 is a graph of measured pressures within a pressure tank of a test fixture attached to a reduced scale gas bag inflator, nozzle, and flow guide configured according to the teachings of the present invention.

FIG. 11 illustrates the measured pressure results obtained by fabricating a gas bag generator, connecting it to a test fixture having a pressure tank (12 in FIG. 1), and combusting a sodium azide gas generant within the generator. The generator was constructed with dimensions set forth above, wherein the ratio of $L_{lead}$ to $R_{bore}$ is about 0.88. The fabricated generator, however, included a rounded corner in place of square corner 219 shown in FIG. 5. As the graph in FIG. 11 illustrates, pressure is greater using air entrainment (trace 272) than without air entrainment (trace 274) during the period of interest up to about forty-five milliseconds. Backflow begins at about forty-five milliseconds. It will be appreciated that gas generant mass flow rates, overall scale of the gas generator, and other variables may be adjusted to alter the time at which deflation begins, to optimally coordinate deflation with the expected time of impact of a vehicle's occupant against the air bag.

The invention may be embodied in other specific forms without departing from its spirit or essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A system for inflating and deflating an air bag within a vehicle, the air bag having an air bag orifice for receiving an inflating gas, the system comprising:

a flow guide having an exterior port in fluid communication with the ambient air outside the vehicle, said flow guide having an air bag port connectable in fluid communication with the air bag orifice, said flow guide also having an internal bore permitting fluid flow between said exterior port and said air bag port;

a nozzle disposed within said flow guide bore; and an inflator secured to said nozzle and containing a pressurized gas means, said inflator configured to expel pressurized gas produced by said pressurized gas means through said nozzle into said flow guide bore, wherein said flow guide comprises a wall, said exterior port is positioned within said wall, said nozzle is disposed substantially concentrically within said flow guide, wherein said flow guide and said nozzle substantially share a central axis, and a transverse plane is any plane transverse to said central axis, wherein said nozzle has an end disposed at a lead distance from said exterior port, said lead distance measured along said wall from an edge of said exterior port to a transverse plane containing said nozzle end, wherein said flow guide has a radius measured from said central axis to said wall in a transverse plane, and wherein the ratio of said lead distance to said radius is in the range from about 0.5 to about 1.0.

2. The system of claim 1, wherein said nozzle has a longitudinal nozzle axis, said exterior port has a longitudinal exterior port axis, and said nozzle axis is angled from said exterior port axis.

3. The system of claim 1, wherein the ratio of said lead distance to said radius is in the range from about 0.8 to about 0.9.

4. The system of claim 3, wherein the ratio of said lead distance to said radius is about 0.88.

5. The system of claim 1, wherein said flow guide has a plurality of exterior ports in fluid communication with the ambient air outside the vehicle.

6. The system of claim 1, wherein said pressurized gas means comprises a gas generant composition capable of producing gas pressure through combustion of said gas generant.

7. The system of claim 1, wherein said pressurized gas means comprises a tank holding gas pressurized to a pressure greater than the pressure of the ambient air outside the vehicle.

8. A system for use in a vehicle, said system comprising:

an air bag having an air bag orifice and an interior, said air bag comprising a substantially air-tight enclosure secured about said air bag orifice such that substantially all fluid communication with said interior occurs by way of said air bag orifice;

a flow guide having an exterior port in fluid communication with the ambient air outside the vehicle, said flow guide having an air bag port connected in fluid communication with said air bag orifice, said flow guide also having an internal bore permitting fluid flow between said exterior port and said air bag port;

a nozzle disposed within said flow guide bore; and an inflator secured to said nozzle and containing a pressurized gas means, said inflator configured to expel pressurized gas produced by said pressurized gas means through said nozzle into said flow guide bore;

wherein said flow guide comprises a wall, said exterior port is positioned within said wall, said nozzle is disposed substantially concentrically within said flow guide, wherein said flow guide and said nozzle substantially share a central axis, and a transverse plane is any plane transverse to said central axis, wherein said nozzle has an end disposed at a lead distance from said exterior port, said lead distance measured along said wall from an edge of said exterior port to a transverse plane containing said nozzle end, wherein said flow guide has a radius measured from said central axis to said wall in a transverse plane, and wherein the ratio of said lead distance to said radius is in the range from about 0.5 to about 1.0.

* * * * *